(12) United States Patent
Mihaila et al.

(10) Patent No.: US 11,431,209 B2
(45) Date of Patent: Aug. 30, 2022

(54) STATOR FOR AN ELECTROMAGNETIC MOTOR OR GENERATOR WITH INDIVIDUAL WINDINGS SUPPORT SNAP-FITTED TO AN ASSOCIATED TOOTH

(71) Applicant: Whylot SAS, Cambes (FR)

(72) Inventors: Vasile Mihaila, Figeac (FR); Romain Ravaud, Labastide-Murat (FR)

(73) Assignee: Whylot SAS, Cambes (FR)

( * ) Notice: Subject to any disclaimer, the term of this patent is extended or adjusted under 35 U.S.C. 154(b) by 37 days.

(21) Appl. No.: 16/754,058

(22) PCT Filed: Dec. 13, 2018

(86) PCT No.: PCT/IB2018/059998
§ 371 (c)(1),
(2) Date: Apr. 6, 2020

(87) PCT Pub. No.: WO2019/123133
PCT Pub. Date: Jun. 27, 2019

(65) Prior Publication Data
US 2020/0328634 A1 Oct. 15, 2020

(30) Foreign Application Priority Data
Dec. 18, 2017 (FR) .................................. FR1701313

(51) Int. Cl.
*H02K 1/14* (2006.01)
*H02K 15/02* (2006.01)
(Continued)

(52) U.S. Cl.
CPC ........... *H02K 1/148* (2013.01); *H02K 15/022* (2013.01); *H02K 16/04* (2013.01); *H02K 1/06* (2013.01);
(Continued)

(58) Field of Classification Search
CPC ............ H02K 1/148; H02K 1/12; H02K 1/14; H02K 1/141; H02K 1/143; H02K 1/145;
(Continued)

(56) References Cited

U.S. PATENT DOCUMENTS 9,780,616 B2 * 10/2017 Langford ............... H02K 3/522
11,165,312 B2 * 11/2021 Tokoi ....................... H02K 1/20
(Continued)

FOREIGN PATENT DOCUMENTS

| EP | 1255344 | 11/2002 |
| EP | 2329583 | 6/2011 |
| JP | 2005143268 | 6/2005 |

OTHER PUBLICATIONS

International Search Report from IA PCT/IB2018/059998 dated Mar. 7, 2019.

*Primary Examiner* — Maged M Almawri
(74) *Attorney, Agent, or Firm* — Crockett & Crockett, PC; K. David Crockett, Esq.; Niky Economy Syrengelas, Esq.

(57) ABSTRACT

The invention relates to a stator (8) for an electromagnetic motor or generator comprising windings (4) and a magnetic circuit, the stator (8) comprising a yoke with a circular or polygonal shape and winding support teeth (3). Each winding (4) rests on a tooth (3) while at least partly surrounding a winding support (13, 14), each winding support (13, 14) comprising or being associated with snap snap-fitting means (15') that cooperate with complementary snap-fitting means (3') supported by a tooth (3) associated with the winding support (13, 14) so that the winding support (13, 14) is fastened to the associated tooth (3).

12 Claims, 2 Drawing Sheets

(51) Int. Cl.
*H02K 16/04* (2006.01)
*H02K 3/52* (2006.01)
*H02K 1/06* (2006.01)
*H02K 1/16* (2006.01)

(52) U.S. Cl.
CPC ............... *H02K 1/14* (2013.01); *H02K 1/141* (2013.01); *H02K 1/16* (2013.01); *H02K 3/522* (2013.01); *H02K 2203/12* (2013.01)

(58) Field of Classification Search
CPC ............ H02K 1/146; H02K 1/16; H02K 1/18; H02K 1/182; H02K 1/185; H02K 1/187; H02K 1/06; H02K 15/022; H02K 3/522
USPC ............... 310/126, 49.29, 216.001, 216.113, 310/216.125–216.129, 216.131–216.137
See application file for complete search history.

(56) References Cited

U.S. PATENT DOCUMENTS

| | | | |
|---|---|---|---|
| 2004/0164641 A1* | 8/2004 | Yamada | H02K 3/524 310/194 |
| 2005/0017596 A1* | 1/2005 | Naito | H02K 1/148 310/156.32 |
| 2005/0073213 A1* | 4/2005 | Naito | H02K 1/148 310/156.32 |
| 2006/0103263 A1* | 5/2006 | Naito | B60L 50/51 310/156.32 |
| 2007/0018528 A1* | 1/2007 | Naitou | H02K 1/148 310/43 |
| 2008/0106161 A1* | 5/2008 | Matsuzaki | H02K 3/524 310/194 |
| 2009/0026851 A1* | 1/2009 | Liou | H02K 1/148 29/598 |
| 2010/0077601 A1 | 4/2010 | Materne et al. | |
| 2011/0115317 A1* | 5/2011 | Stark | H02K 1/148 310/71 |
| 2011/0210640 A1* | 9/2011 | Elser | H02K 3/522 310/208 |
| 2011/0221297 A1* | 9/2011 | Langford | H02K 15/024 310/215 |
| 2015/0229177 A1* | 8/2015 | Langford | H02K 1/146 310/215 |

* cited by examiner

STATOR FOR AN ELECTROMAGNETIC MOTOR OR GENERATOR WITH INDIVIDUAL WINDINGS SUPPORT SNAP-FITTED TO AN ASSOCIATED TOOTH

FIELD OF THE INVENTIONS

The present invention relates to a stator for an electromagnetic motor or generator with an individual winding support snap-fitted to an associated tooth. The motor or electromagnetic generator is advantageously an axial flux machine.

BACKGROUND

The present invention has an advantageous but not limited application for an electromagnetic motor that delivers high power at a high speed of rotation of the rotor, which is achieved by the specific characteristics of the stator according to the present invention in interaction with the specific characteristics of a rotor associated with the stator. A motor or generator of this type can be used, for example, as an electromagnetic motor in a fully electric or hybrid automotive vehicle.

Advantageously but restrictively, an electromagnetic motor or generator can comprise at least one rotor framed by two stators, whereby these elements can be superimposed on each other and be separated by at least one air gap on the same shaft.

In high-speed applications, it is necessary to have not only a compact system made possible by the reduction of the weight and size of the axial motor for optimal performance, but also a very good mechanical strength of the rotating part, i.e. of the rotor or rotors, to increase the reliability of the system as well as that of the stators.

In high-speed applications it is necessary to reduce losses to achieve optimum efficiency. Miniaturization is an increasingly sought-after objective in automobile applications. To achieve that it is important to have a compact system made possible by the reduction of the weight and size of the axial motor, as well as a very good mechanical strength of the rotating part to improve the reliability of the system.

For an axial flux electromagnetic machine, the rotor comprises a body in the form of the disk that has two circular faces connected by a thickness, the disk being delimited between an external ring and an internal periphery limiting a cavity for a rotating shaft.

At least two permanent magnets are applied against at least one of the two circular faces of the body called the support face. For a rotor with a single air gap designed to be associated with the stator, a single circular face of the body carries magnets while for a rotor with two air gaps with one respective stator, it is the two faces that carry the magnets.

The magnets are each retained on the face or their respective face by retaining means, and interval being left between these at least two magnets on a given face.

The stator or each stator carry winding elements comprising a tooth supporting a coil, the tooth being framed on each of the two sides by a notch, a metal wire made of material that is a good conductor being wound around the tooth to form each winding.

When the one or more series of windings are supplied with electricity, the rotor which is fastened to the output shaft of the motor is subjected to a torque resulting from the magnetic field, the flux created being an axial flux for an axial flux electromagnetic machine and a radial flux for a radial flux machine.

There are a plurality of ways to shape a winding around the teeth, the simplest being to form a concentric winding. This is unsatisfactory in terms of the efficiency of the motor or the generator wound in this fashion. However, great progress has been made in the design of rotors by increasing their durability and the output of the motor and of the machine, which has once again made it possible to use a concentric winding for a stator.

However, it is necessary to rework the design of a stator with a concentric winding to make its fabrication more efficient.

EP-A-2 329 583 describes a stator of an electromagnetic motor or generator comprising windings and a magnetic circuit, the stator comprising a yoke in a circular or polygon shape and winding support teeth, each winding resting on one tooth while at least partly surrounding one winding support.

Each winding support comprises or is associated with snap-fit means that interact with complementary snap-fit means carried by a tooth associated with the winding support so that the winding support is fastened to the associated tooth with, on one hand, each tooth and, on the other hand, an intermediate portion and cover portion of each winding support being in the shape of a prism with two triangular or trapezoidal faces with minor base more internal to the yoke, and a major base more external to the yoke connected by two inclined lateral faces.

This document does not make it possible to increase the efficiency of the fabrication of a toothed stator by making the winding of the windings of electric wires on each tooth easier on account of the snap-fit means proposed in this document.

The basic problem addressed by the present invention is to make the fabrication of a toothed stator easier and more efficient by making the winding of the windings of electrical wires on each tooth easier.

SUMMARY

For this purpose the present invention relates to a stator for an electromagnetic motor or generator comprising windings and a magnetic circuit, the stator comprising a yoke with a circular or polygonal shape and winding support teeth, each winding resting on a tooth while at least partly surrounding a winding support, each winding support comprising or being associated with snap-fitting means that cooperate with complementary snap-fitting means supported by a tooth associated with the winding support so that the winding support is fastened to the associated tooth with, on one hand, each tooth and, on the other hand, the intermediate portion and cover portions of each winding support being in the shape of a prism with two triangular faces or in the form of a trapezoid with a minor base more internal to the yoke and a major base more external to the yoke connected by two inclined lateral faces, characterized in that the external contour of the flat cover portion defines on the interior a triangular or rectangular empty space carrying either at least a portion of the snap fitting that projects toward the tooth, forming the snap-fitting means, the tooth comprising in proximity to each lateral edge of its face facing the winding a groove, the two grooves respectively housing one of the snap-fitting portions forming complementary snap-fitting means, or a blocking element in the shape of a prism with two triangular faces or in the shape of a trapezoid being inserted, the blocking element having an external contour corresponding to the internal contour of the empty space with just enough clearance between the external contour of the blocking element and the internal contour of the space for the insertion of the blocking element in the empty space, the edges of the triangular face facing the associated tooth of the blocking element or at least the two edges facing the associated tooth of the inclined lateral faces of the trapezoidal shape of the blocking element carrying at least a snap-fitting portion that projects toward the tooth, forming the snap-fitting means, the tooth comprising in proximity to each lateral edge of its face facing the winding a groove, the two grooves respectively housing one of the snap-fitting portions, forming complementary snap-fitting means.

The technical effect achieved is an increased ease of assembly of the windings that takes even better advantage of the use of a concentric winding for an electromagnetic motor or generator, which makes it possible to amplify their use. The snap-fitting is easily employed and makes possible a firm hold of the winding on the tooth, preventing an escape of the winding from an insertion on the tooth.

In general, the intermediate and cover portions have a shape adapted to that of the associated tooth.

In the first embodiment of the present invention, with a portion of the snap-fitting projecting toward the tooth, the snap-fitting is accomplished by the lateral faces of the empty space in the winding support after insertion of the tooth into this empty space. The lateral faces of the space can each carry a lug that is inserted into a groove associated with the tooth.

The second embodiment requires a blocking element. It is this blocking element that creates the snap-fit with the tooth. "In proximity to" each lateral edge of the face facing the winding does not necessarily mean that the grooves are on this face. The grooves can be on the lateral faces of the tooth in proximity to the lateral edge of the facing surface.

Advantageously, the winding support comprises an intermediate portion on which the winding is wound and a flat cover portion that is farthest from the associated tooth in the position in which the winding support is fastened to the tooth, being separated from the tooth by the winding and the intermediate portion, the flat cover portion having an external contour that a distance covers at least one external perimeter facing the winding and abutting against the external perimeter of the winding, the winding support being in one piece or not.

It is the flat cover portion, by its external contour, that poses an obstacle to an escape of the winding from an insertion around the tooth. The intermediate portion can have grooves corresponding to the dimension of the electric wire to be wound for an easy winding of the coil.

Advantageously, each winding is wound concentrically around the intermediate portion. That represents the simplest manner of winding a winding.

Advantageously, the flat cover portion associated with a tooth is adjacent to a flat cover portion associated with each adjacent tooth, an assembly of overlapping portions forming a ring entirely covering the teeth and the intervals between them.

This arrangement makes it possible to obtain a complete and continuous ring, which ensures better protection of the windings.

Advantageously, the winding supports are made of plastic. This is the case in particular in the second embodiment necessitating a blocking element which is advantageously metallic.

The windings are advantageously three-phase windings.

Advantageously, the winding support comprises on one extremity turned toward the yoke a ribbed support of the winding phases, a set of ribbed supports of the winding phases forming a ring at the base of the teeth against the yoke of the stator supporting the teeth, the ring having concentric ribs. The winding phases are thereby held in the ribbed supports, achieving a complete and closed ring.

Advantageously, each tooth is formed by coiled or laminated sheets.

The invention relates to a motor or electric generator comprising at least one rotor and at least one stator, the motor being an axial flux motor, characterized in that the stator is as described above.

Advantageously, the at least one rotor comprises magnet structures forming magnetic poles, each magnet structure being composed of a plurality of unitary magnets, cover discs being arranged axially on each of the two opposite axial faces of the at least one rotor, the cover discs being made of composite materials, the cover discs and the magnet structures being coated in a layer of external composite coating defining the exterior contour of the at least one rotor.

One of the principal objects of this preferred embodiment of the present invention is to replace one or more large magnets with a plurality of small magnets. The magnetic flux is therefore created by a multitude of small magnets, the number of which can be at least 20 and can even exceed 100 for each magnetic pole. A rotor of the prior art can comprise from 1 to 10 magnets while the preferred embodiment of the present invention has many more small magnets in each magnet structure.

A distinction must be made between a magnet structure, a rotor that can carry five to ten or even more magnets, and unitary magnets, of which there are significantly more, whereby a rotor can carry several hundred, for example. The small unitary magnets according to the present invention can be inserted into respective cells by a robot.

That makes it possible to obtain a rotor which, among other advantages, can rotate at high speed and that does not contain any iron, which limits the rotor losses.

According to this optional form of the invention, it has been discovered that a plurality of unitary magnets gives a magnet structure that has greater strength on the level of the overall flexure of the rotor while producing very little heat on account of the low losses generated, the heat dissipated by the unitary magnets being less than the heat dissipated by a larger magnet all in one piece corresponding to them.

The magnet structure comprises a layer of non-conductive composite coating the unitary magnets and the mesh. Moreover, its mechanical strength can be high and the coating can be easily applied, in particular by means of injection of the composite over an arrangement of unitary magnets held in place with respect to one another by any appropriate means.

With a rotor of this type, it is advantageous to associate one or two stators comprising iron teeth with concentric windings, which is easy to do. The only problem was to simplify the operation of winding the teeth, which the present invention has solved by using a winding support snap-fitted onto the tooth.

The present invention accomplishes the reverse process of the approach taken by many manufacturers of motors and electromagnetic generators. In the prior art, efforts at innovation were concentrated on the stators by designing increasingly complex windings that are difficult to design.

On account of the design of an efficient rotor that contains no iron and is coated by the composite and contains magnet structures, each made up of a plurality of magnets, it has become possible to use concentric windings for the stator or stators, while a concentric winding of this type would not be entirely satisfactory with permanent magnets all in one piece as used in the closest prior art.

It has been determined that the utilization of such an association of a composite rotor with the at least one iron stator comprising iron teeth or studs and a concentric winding for the stator mounted on a winding support achieves a synergy with regard to the power of the motor or of the generator used as well as the ease of fabrication and the mechanical strength of the motor or the generator.

The motor advantageously comprises at least two stators and at least one rotor.

The present invention further relates to a method of winding the windings on a respective tooth of a stator of an electromagnetic motor or generator, the stator or the motor being as described above, characterized in that it comprises the following steps:

winding of a wire made of an electrical conductor around a portion of a winding support, the winding support being inserted at least partly or not around the tooth, when the winding support has not previously been inserted at least partly around the tooth, at least partial insertion of the winding around the tooth, and snap-fitting of the winding support on the tooth while pushing the winding support toward the yoke of the stator.

A firm hold of the windings on the associated tooth is therefore obtained by the use of a winding support supporting the winding and preventing it from escaping around the tooth by acting as a stop against such an escape. The fastening of the winding support with the associated tooth is accomplished by a snap-fitting, simply by inserting the winding support around the tooth and pushing it against the yoke, by the insertion of snap-fitting means into a respective groove that acts as complementary snap-fitting means.

Lateral lugs that extend in the interior of the winding support in the vicinity of the contour of a tooth advantageously penetrate into a respective groove on the tooth, this snap-fitting being accomplished automatically as a result of the elasticity of the winding support or of a blocking element that penetrates into the winding support and at least partly surrounds the tooth.

BRIEF DESCRIPTION OF THE DRAWINGS

Other characteristics, objects and advantages of the present invention are presented in the detailed description below with reference to the accompanying drawings, which are given by way of non-restricting examples, and in which.

DETAILED DESCRIPTION OF THE INVENTIONS

The figures are given by way of example and are not restrictive of the invention. They constitute schematic representations designed to facilitate an understanding of the invention and are not necessarily drawn to scale or illustrations of practical applications. In particular, the dimensions of the different parts are not representative of reality.

Figure 1:
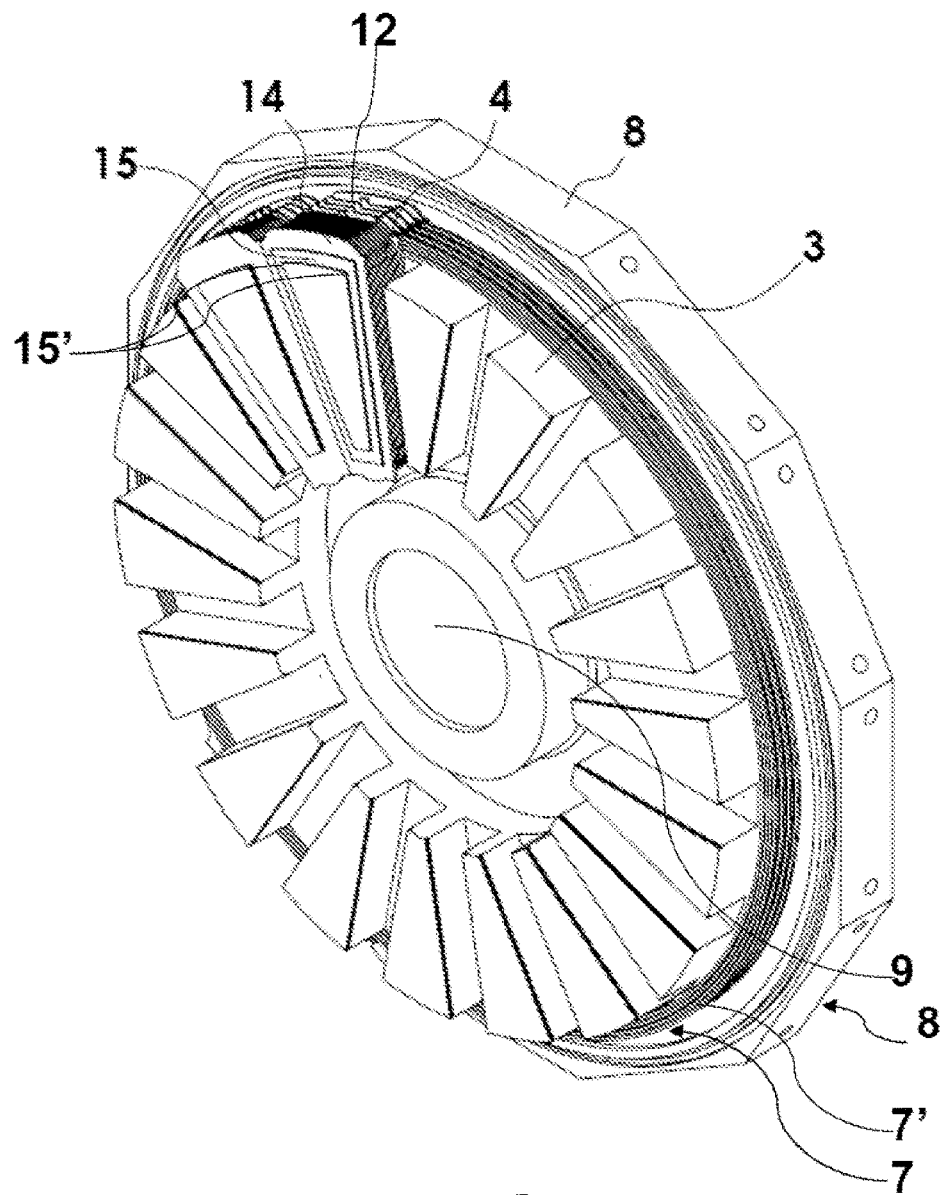
FIG. 1 is a schematic representation of a view in perspective of a stator comprising teeth and windings mounted on a respective tooth, the stator being according to the present invention by incorporating a winding support that is snapped-fitted onto the tooth, two winding supports being shown in this FIG. 1.
Figure 3:
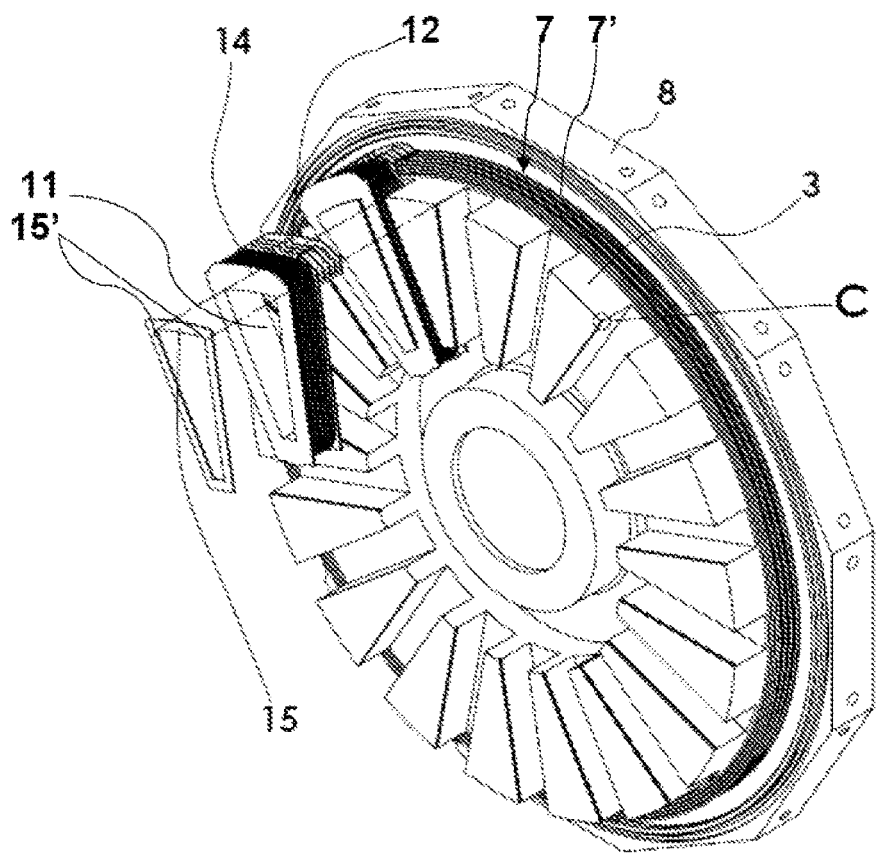

In FIGS. 1 and 3, only one winding support, one blocking element and one ribbed phase support are shown with reference numbers, although what is described for these respective elements applies for the corresponding other elements. For reasons of clarity of the figures, all the windings and winding sports are not represented and all the teeth, with the exception of one or two teeth, are left without windings.

With reference to all the figures and most particularly to FIGS. 1 and 3, the present invention relates to a stator 8 for an electromagnetic motor or generator comprising windings 4 and a magnetic circuit comprising a yoke in a circular or polygonal shape and teeth 3 to support windings.

In FIGS. 1 and 3, a single tooth is identified as 3, but the description relating to this individual tooth 3 also applies for all the other teeth 3 of the stator.

According to the invention, each winding 4 rests on a tooth 3 while surrounding at least partly a winding support 13, 14. That requires that at least a portion of the winding sport 13, 14 is inserted around the tooth 3.

Each winding support 13, 14 comprises or is associated with snap-fitting means 15' that cooperate with complementary snap-fitting means 3' carried by a tooth 3 associated with the winding support 13, 14 so that the winding support 13, 14 is fastened with the associated tooth 3.

The snap fit can be achieved directly between the winding support 13, 14 and the tooth 3, in which case each winding support 13, 14 carries the snap-fitting means 15' or between an intermediate part fastened to the winding support 13, 14 and the tooth 3, in which case each winding support 13, 14 is associated with snap-fitting means 15' which the winding support 13, 14 does not have.

As can be seen in particular in FIG. 3, the winding support 13, 14 can comprise an intermediate portion 13 on which the winding 4 is wound and a flat cover portion 14 which is farthest from the associated tooth 3 in the fastening position of the winding support 13, 14 on the tooth 3, and is separated from the tooth 3 by the winding 4 and the intermediate portion 13. The flat cover portion 14 and the intermediate portion 13 can be in a single piece.

The cover portion 14 can have an external contour covering at a distance at least one external perimeter facing the winding 4 and one face of the tooth 3 turned toward the winding. "At a distance" means that the flat cover portion 14 is not in contact against the face of the tooth 3 turned toward the winding 4 and "cover" means that the flat cover portion 14 conceals the surface of the tooth 3 turned toward the winding 4 when viewed head on. "Covering at least" means that the surface area of the flat cover portion 14 can be greater than the surface area of the tooth 3 turned toward the winding.

The cover portion 14 abuts an output of the winding 4 around the tooth 3 and around the intermediate portion 13.

As illustrated in FIG. 3, each winding 4 is wound concentrically around the intermediate portion 13.

Figure 2:
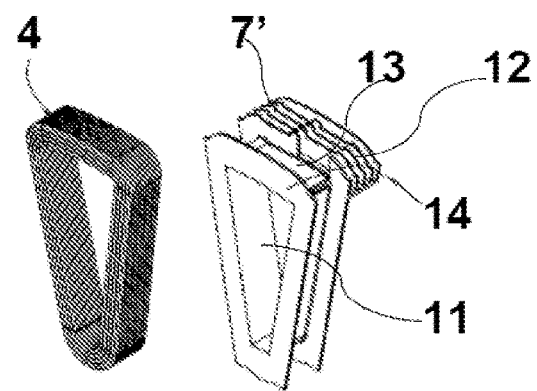
FIG. 2 is a schematic representation of an exploded view in perspective of a winding support and a winding, the winding support being used in the stator according to the present invention, FIG. 3 repeats the characteristics of FIG. 1, with a winding support and a blocking element shown at some distance from the stator according to the present invention, the snap-fitting means of the blocking element and the complementary snap-fitting means borne by the associated tooth being visible in this FIG. 3.

As illustrated in FIGS. 1 to 3, on one hand each tooth 3, and on the other hand the intermediate portion 13 and cover portion 14 of each winding support 13, 14 can have a trapezoidal shape with a minor base more internal to the yoke and a major base more external to the yoke connected by two inclined lateral faces.

It is also possible that the intermediate portion 13 and cover portion 14 of each winding support 13, 14 can be in the shape of a prism with two triangular faces. This configuration is not shown in the figures, but can be easily derived from these figures.

As noted above, the snap-fitting between the winding support 13, 14 and the associated tooth 3 can be direct or indirect, "direct" signifying that the winding support 13, 14 performs the snap-fitting directly with the associated tooth 3 and "indirect" signifying that an intermediate blocking element 15 fastened with the winding support 13, 14 accomplishes the snap-fitting with the associated tooth 3.

Only the second embodiment with the indirect snap-fitting is shown in the figures. Nevertheless, for the description of the first embodiment, reference will be made in the figures to characteristics common to both embodiments.

In the first embodiment with a direct snap-fitting not shown in the figures, the external contour of the flat cover portion 14 borders on the interior a triangular or rectangular empty space 11 containing at least a portion of the snap-fitting that projects toward the tooth 3 forming snap-fitting means 15.

Figure 4:
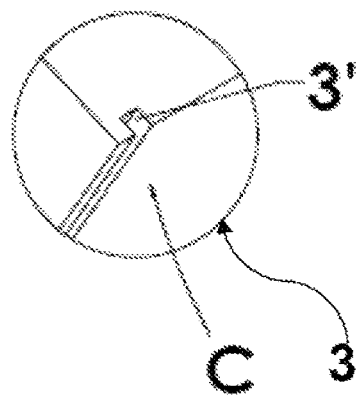
FIG. 4 is a schematic representation of the circled portion C on a larger scale than the other figures of a view in perspective of a portion of a tooth showing the complementary snap-fitting means carried by the tooth, this tooth being part of a stator according to the present invention.

As complementary snap fitting means 3', the tooth 3 can have, in proximity to each lateral edge of its face toward the winding 4, a groove 3', the two groups 3' respectively housing one of the portions of the snap-fitting. The complementary snap fitting means 3' can also be the same in both embodiments with direct or indirect snap-fittings. This can be seen in FIG. 4, which shows an enlarged view of a portion of the tooth 3 having a groove 3' and which is common to both embodiments.

In the second embodiment with an indirect snap-fitting, with reference to FIGS. 1 to 4, the external contour of the flat cover portion 14 can border on the interior a triangular or rectangular empty space 11 corresponding to a prismatic or trapezoidal shape of the cover portion 14.

A blocking element 15 in the shape of a prism with two triangular faces or in the shape of a trapezoid is inserted into this triangular or rectangular empty space 11. The blocking element 15 can have an external contour corresponding to the internal contour of the empty space 11 with just enough clearance between the external contour of the blocking element 15 and the internal contour of the empty space 11 for the insertion of the blocking element 15 into the empty space 11.

The edges of the triangular face facing the associated tooth 3 of the blocking element 15 or at least the two edges facing the associated tooth 3 of the inclined lateral faces of the trapezoidal shape of the blocking element 15 can have at least a snap-fitting portion 15' that projects toward the tooth 3 forming the snap-fitting means 15'.

As for the first embodiment, the associated tooth 3 can comprise, in proximity to each lateral edge of its face facing the winding 4, a groove, the two grooves 3' respectively housing one of the snap-fitting portions and forming the complementary snap-fitting means 3'. The grooves 3' can preferably extend over the lateral inclined faces of the tooth 3 and not necessarily over the face of the tooth facing the winding.

This can be valid for all the winding supports 4 and all the teeth 3. The flat cover portion 14 associated with a tooth 3 can be adjacent to a flat cover portion 14 associated with each adjacent tooth 3. A set of cover portions can then form a ring that entirely covers the teeth three and the intervals separating them.

The teeth 3 can be made of iron or plasto-ferrite, while the winding supports 4 can be made of strong plastic. Each tooth 3 can be formed by coiled or laminated sheet-metal.

The blocking element 15, when present, is advantageously metallic so that it is strong and can achieve a firm snap-fit in position. The windings 4 can be three-phase windings 4.

As shown in FIGS. 1 to 3, the winding support 13, 14 can comprise, on one end turned toward the yoke, a ribbed winding phase support 12. A set of ribbed phase supports 12 of the winding 4 can form a ring 7 at the base of the teeth 3 against the yoke of the stator 8 supporting the teeth 3, the ring 7 having concentric ribs 7', the ring being concentric to the center of the stator 8 having a central empty space.

The invention relates to a motor or electric generator comprising at least one rotor and at least one stator 8 as described above, the motor being an axial flux motor. The motor can comprise at least two stators 8 and at least one rotor.

In one embodiment that is particularly advantageous but that is not shown in the accompanying figures, the rotor or rotors comprise magnet structures forming magnetic poles, each magnet structure being composed of a plurality of unitary magnets. Cover discs can be arranged axially on each of the two opposite axial faces of the at least one rotor.

It is possible to use different types of materials for the unitary magnets, selected for example from among the samarium cobalt alloys (Sm—Co), alloys of aluminum, nickel and cobalt, hard ferrites and neodymium-iron-boron materials, the important thing being that these materials must be able to withstand being machined into lugs of a small width or a small diameter compared to their length.

The cover discs can be made of composite material. Moreover, the cover discs and the magnet structures can be coated or wrapped in an external layer of composite material defining the exterior contour of the at least one rotor.

The present invention further relates to a method for winding the windings 4 on a respective tooth 3 of a stator 8 of an electromagnetic motor or generator, the stator 8 or the motor being as described above.

The method comprises the step of winding 4 an electrically conductive wire, advantageously made of copper, around a portion of a winding support 13, 14, the winding support 13, 14 being inserted at least partly or not around the associated tooth 3.

The winding support 13, 14 can be removed from the associated tooth 3 when the winding 4 has already been partly inserted around the tooth.

In the first case, when the winding support 13, 14 has not been previously at least partly inserted around the tooth 3, the winding 4 is at least partly inserted around the tooth.

The following step is the snap-fitting of the winding support 13, 14 on the tooth 3 by pushing the winding support 13, 14 toward the yoke of the stator 8, i.e. by inserting the winding support 13, 14 until its snap-fitting means 15' cooperate with the complementary snap-fitting means 3' provided on the tooth.

The invention claimed is:

1. A stator (8) for an electromagnetic motor or generator comprising:
   a yoke with a circular or polygonal shape;
   a plurality of winding support teeth (3) extending from the yoke;

a plurality of windings (4) and winding support (13, 14) structures, with each one of the plurality of winding (4) and winding support (13, 14) structures fastened to a corresponding one of the plurality of winding support teeth;

wherein each one of the windings (4) and winding support structures (13, 14) comprises:

one of the windings (4) wound about a corresponding one of the winding support structures (13, 14), and at least partially surrounding said one of the corresponding winding support (13, 14) structures;

each of the plurality of winding supports (13, 14) being in the shape of a prism with two triangular faces or in the form of a trapezoid with a minor base more internal to the yoke and a major base more external to the yoke connected by two inclined lateral faces, and characterized in that the winding support comprises a flat cover portion (14) and of said flat cover portion (14) defines on the interior thereof an empty space (11), said empty space having an internal contour in a prism shape or trapezoid shape corresponding to the shape of the winding support (13, 14), and further comprising a blocking element (15) having an external contour corresponding to the internal contour of the empty space (11) with just enough clearance between the external contour of the blocking element (15) and the internal contour of the space (11) for the insertion of one of the winding support tooth (3) into the empty space (11), with internal edges of the blocking element facing said winding support tooth (3) with the blocking element (15) carrying a first snap-fitting means (15') that projects toward the winding support tooth (3), said winding support tooth (3) comprising a groove forming a complementary snap fitting means (3'), complimentary to the first snap fitting means (15'), said complementary snap fitting means (3') proximate the inclined lateral faces of the winding support tooth, said complementary snap fitting means (3') housing the first snap-fitting means (15').

2. A stator (8) according to claim 1, in which the winding supports (4) are made of plastic.

3. A stator (8) according to claim 1, in which each tooth (3) of the plurality of teeth is formed by coiled or laminated sheets.

4. A winding method for windings (4) on a respective tooth (3) of a stator (8) of an electromagnetic motor or generator, the stator (8) being according to claim 1, characterized in that it comprises the following steps:

winding (4) of an electrically conductive wire around a portion of a winding support (13, 14), the winding support (13, 14) being inserted, winding the winding (4) around the tooth (3), and snap-fitting of the winding support (13, 14) onto the tooth (3), pushing the winding support (13, 14) toward the yoke of the stator (8) by the insertion of snap fitting means into a respective groove (3') as a complementary snap-fitting means.

5. A stator (8) according to claim 1, in which the windings (4) are three-phase windings (4).

6. A stator (8) according to claim 5, in which the winding support (13, 14) comprises, a set of ribbed phase supports (12) of the winding (4) forming a ring (7) at the base of the teeth (3) against the yoke of the stator (8) carrying the teeth (3), the ring (7) having concentric ribs (7') to for a ribbed winding phase support (12).

7. A stator (8) according to claim 1, in which the winding support (13, 14) comprises an intermediate portion (13) on which is wound the winding (4) and a flat cover portion (14) which is farthest from the associated tooth (3) in the fastening position of the winding support (13, 14) on the tooth (3), being separated from the tooth (3) by the winding (4) and the intermediate portion (13), the flat cover portion (14) having an external contour that covers at a distance at least an external perimeter facing the winding (4) and abutting against the external perimeter of the winding (4).

8. A stator (8) according to claim 7, in which each winding (4) is wound concentrically around the intermediate portion (13).

9. A stator (8) according to claim 7, in which the flat cover portion (14) forms a ring that covers in their entirety the teeth (3) and the intervals that separate them.

10. A motor or electric generator comprising at least one rotor and at least one stator (8), the motor being an axial flux motor, characterized in that the stator (8) is a stator according to claim 1.

11. A motor according to claim 10, in which the at least one rotor comprises magnet structures forming magnetic poles, each magnet structure being composed of a plurality of unitary magnets, cover discs being arranged axially on each of two opposite axial faces of the at least one rotor, the covering discs being made of composite material, the covering discs and the magnet structures being coated or wrapped in a layer of external coating of composite material defining the exterior contour of the at least one rotor.

12. A motor according to claim 11, which comprises at least two stators (8) and at least one rotor.

* * * * *